United States Patent
Rossin

(10) Patent No.: US 6,511,174 B1
(45) Date of Patent: Jan. 28, 2003

(54) EYEGLASS SUPPORT TEMPLE AND PROCEDURE FOR THE MANUFACTURE THEREOF

(75) Inventor: Paolo Rossin, Legnano (IT)

(73) Assignee: Optigen S.r.l., Legnano (IT)

( * ) Notice: Subject to any disclaimer, the term of this patent is extended or adjusted under 35 U.S.C. 154(b) by 0 days.

(21) Appl. No.: 10/071,367

(22) Filed: Feb. 8, 2002

(51) Int. Cl.[7] .................................................. G02C 5/14
(52) U.S. Cl. ........................................ 351/11; 351/111
(58) Field of Search ............................ 351/41, 111, 124, 351/119, 123, 122; 2/453; 228/175

(56) References Cited

U.S. PATENT DOCUMENTS 5,160,947 A * 11/1992 Hyoi ........................... 351/124
5,640,217 A * 6/1997 Hautcoeur et al. ............. 351/41
6,213,383 B1 * 4/2001 Nakanishi .................... 228/175

* cited by examiner

*Primary Examiner*—Hung Xuan Dang
(74) *Attorney, Agent, or Firm*—Hedman & Costigan, P.C.

(57) ABSTRACT

An eyeglass support temple (14) comprising at least one first rod (13), made out of shape memory alloy or any other highly elastic alloy which is difficult to weld, which at one of its ends carries a hinge (17) for the connection to a frame of a pair of glasses. Another end portion of the first rod (13) is inserted and locked in a bush (15) integral with a second rod (12), made out of ductile material, where at least one portion of such a second rod (12) is shaped so as to match the shape of the human ear. The temple (14) is realised through a process which comprises a step in which an end portion (16) of a first rod (13) is inserted into a bush (15), a subsequent step in which the bush (15) is pressed onto the first rod (13) so as to realise the coupling between the first rod (13) and the second rod (12), and a further step in which a portion of the second rod (12) is shaped, so as match the shape of the human ear.

6 Claims, 2 Drawing Sheets

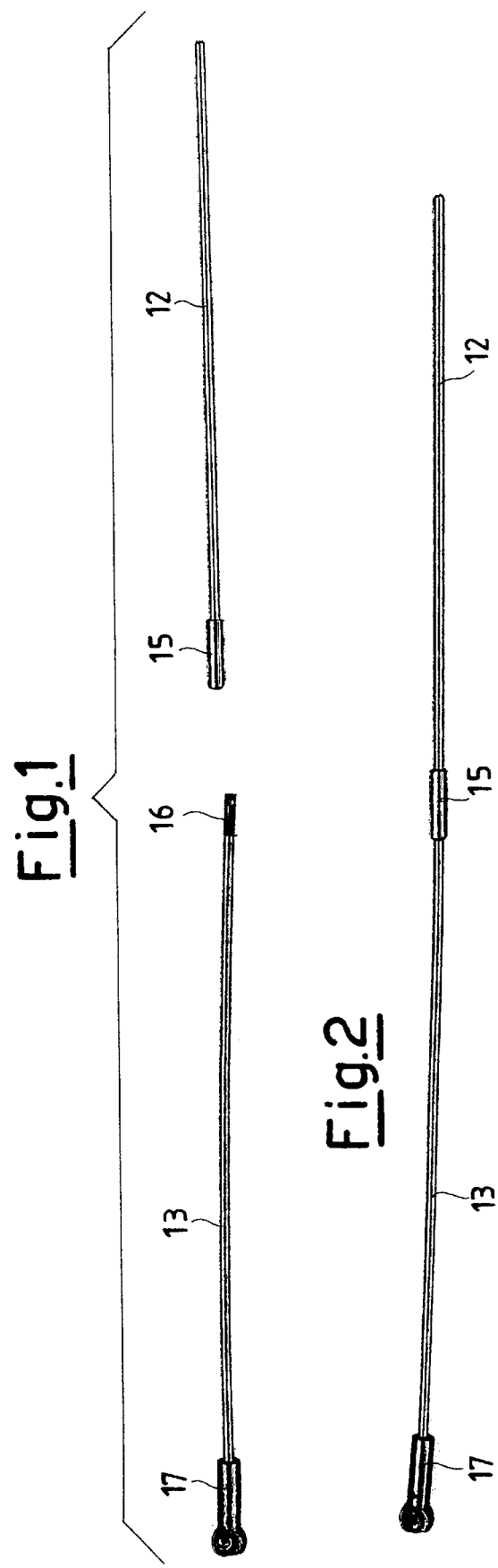

EYEGLASS SUPPORT TEMPLE AND PROCEDURE FOR THE MANUFACTURE THEREOF

The present invention refers to an eyeglass support temple and to a process for the manufacture thereof. As is known, eyeglass temples have one end hinged to a frame, which supports two lenses, and a bent free end to match the shape of the human ear.

The bent free end is, usually, also coated by a protective sleeve.

Often eyewear frames and support temples are made of shape memory alloy or of highly elastic alloys, such as NiTi alloy.

Currently, to realise temples in shape memory alloy with the bent free end, the solution is that of "reheating" at a high temperature such an end which one wishes to bend and make adjustable.

In this way, the part thus treated partly loses its shape memory properties.

However, this technique only partially solves the problem, since the remainder of the shape memory property of the temple, which still cannot be eliminated, does not allow the complete adaptability of the eyewear support temples to the human ear. Indeed, both due to temperature variations and due to mechanical stresses deriving from the normal use of the glasses, the bent free end always tends to lose the mechanically applied shape to go back to the previously rmemorised one by means of heat treatments.

The purpose of the present invention, therefore, is that of eliminating the outlined technical drawbacks, realising an eyeglass support temple which can adapt perfectly to the human ear, so as to be comfortable.

A further purpose of the invention is that of realising an eyeglass support temple which in time keeps the shape which it was set with.

The last but not least purpose of the invention is that of indicating a process for the manufacture of the eyeglass support temple.

These and other purposes, according to the present invention, are achieved by realising an eyeglass support temple and a process for the manufacture thereof according to the attached claims.

Advantageously, the temple according to the present invention is realised by using one rod made of shape memory alloy and one rod made of ductile material, joined to each other.

The rod made of ductile material is bent, to give it the desired shape, which precisely due to the material used, is subsequently maintained in time.

In a preferred embodiment, the join is realised through a bush which extends from one end of the rod made of ductile material.

An end of the rod made of shape memory alloy is inserted and locked into such a bush.

The end of the rod made of shape memory alloy, before being inserted into the bush, is oxidised, so that its surface is not glossy and slippery, but on the contrary is rough and guarantees a good grip and seal.

The same join can also be used to join the bridge and nose pad ends made of shape memory alloy to the frame, which is also made of shape memory alloy.

Such a join allows the assembly of the bridges and the nose pads on the frame which would otherwise be difficult to realise, since these types of alloys, if welded directly, do not guarantee a good seal.

Further characteristics and advantages of an eyeglass support temple and of a procedure for the realisation thereof, according to the present invention, shall become clearer from the following description, given as an example and not for limiting purposes, referring to the attached schematic drawings, wherein:

FIG. 1 shows an exploded side elevation view of two rods used to realise the eyeglass support temple, according to the invention;

FIG. 2 shows a side elevation view of the two rods of FIG. 1 joined to each other;

Figure 3:
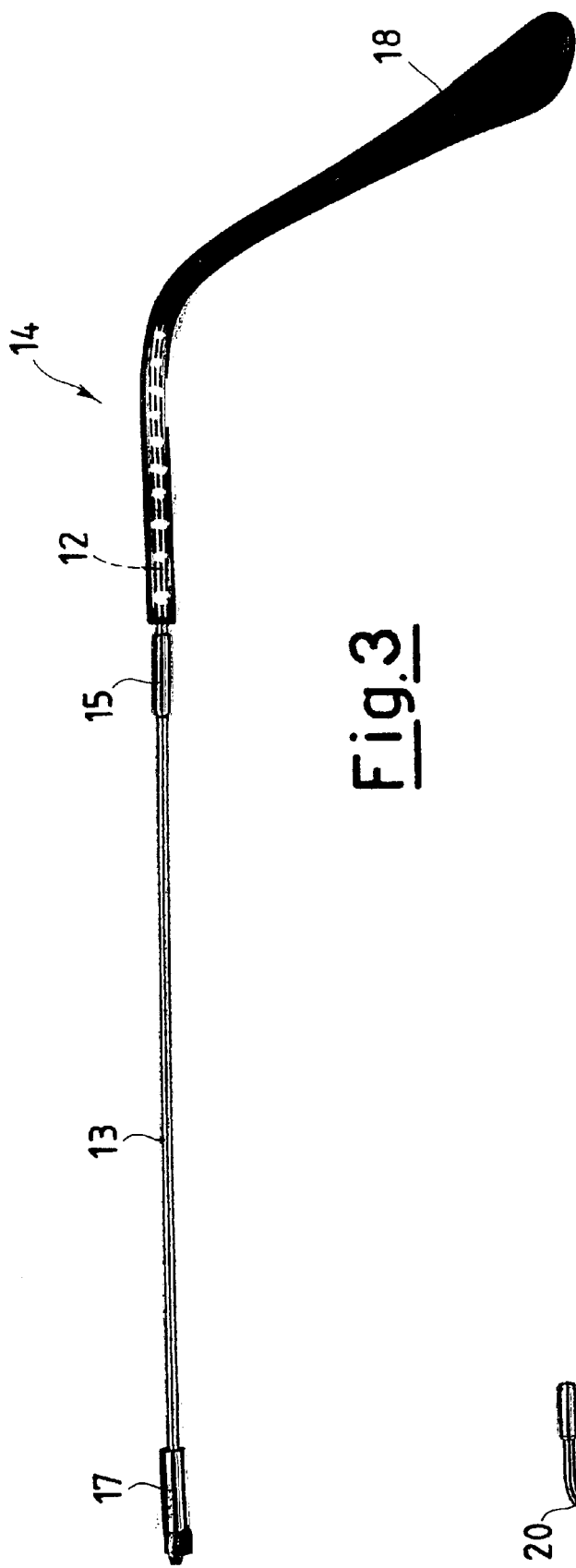
FIG. 3 shows a side elevation view of an eyeglass support temple according to the present invention.

With reference to FIGS. 1 and 2, two elongated elements or rods 12, 13 are shown which are used to realise an eyeglass support temple 14, shown in FIG. 3.

The rod 12 is made out of a ductile material, such as "Monel".

From one end of the rod 12 extends a bush 15, which has one of its ends open, whereas the opposite end is received by the rod 12.

Inside the bush 15 is inserted the rod 13, made out of shape memory alloy such as a NiTi alloy.

The rod 13 has an end portion 16 which is inserted into the bush 15, and which is oxidised.

In this way the surface of such a portion 16, which would otherwise be glossy and slippery, is made to be rough and guarantees a good seal.

It should be noted that an end portion of the rod 13, opposite to the end portion 16, carries a hinge 17 for joining to a frame of a pair of glasses.

In FIG. 3 the eyeglass support temple 14 is shown, realised using the rods 12 and 13 joined to each other, as already described.

The temple 14 comprises the rod 13 which at its free end carries the hinge 17, whereas the opposite end of the rod 13 is locked inside the bush 15.

The bush 15 is integral with the rod 12, which is bent and shaped, so as to match the shape of the human ear. Finally, the rod 12 is covered with a shaped sleeve 18. The described join is also used either to join bridges to two portions of the frame which are to be connected, or even to join nose pads to the frame.

Also in this case both the bridges and the nose pads are made out of shape memory alloy.

Figure 4:
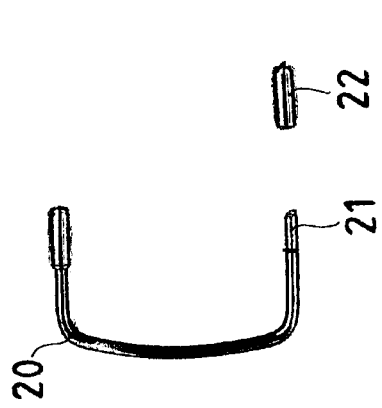
FIG. 4 shows a side elevation view of a support for a nose pad.

In particular, in FIG. 4 a U-shaped nose pad 20 is shown which has an oxidised end portion 21.

The end 21 is locked inside the bush 22, which is then made integral with a glasses frame.

The bridge (not shown), on the other hand, has two opposite end portions which are oxidised, each of which is inserted and locked inside a bush which is then made integral with two portions of the frame to be connected.

The eyeglass support temple 14 of the type indicated is manufactured through a process, also object of the present invention, which is described in greater detail hereafter.

In a first step of the process of the invention, the end portion 16 of the rod 13 is oxidised.

In a second step the end portion 16 of the rod 13 is inserted into the bush 15, which is integral with the rod 12. Such a coupling is then improved by pressing the bush 15 against the portion 16.

In a third step of the process the rod 12 is covered with a sleeve 18 and is bent to make it take on a shape which matches the shape of the human ear.

In practice it has been noted how the eyeglass support temple and the process for the manufacture thereof, according to the invention, are particularly advantageous not just because the temple can perfectly match the human ear, but also because the bent shape of its free end does not tend to change by itself in time. In such a way the user is guaranteed maximum comfort of the glasses in time.

The eyeglass support temple and the process for the manufacture thereof thus conceived are susceptible to numerous modifications and variants, all covered by the invention; moreover, all of the details can be replaced with technically equivalent elements.

In practice, the materials used, as well as the sizes, can be whatever according to the technical requirements.

What is claimed is:

1. Eyeglass support temple (14) comprising at least one first rod (13), made out of shape memory alloy or any other highly elastic alloy which is difficult to weld, which at one of its ends carries a hinge (17) for the connection to a frame of a pair of glasses, characterized in that another end of said first rod (13) is joined to an end of a second rod (12), made out of ductile material, where at least one portion of said second rod (12) is shaped so as to match the shape of the human ear.

2. Temple (14), according to claim 1, characterized in that said end of said second rod (12), joined to said first rod (13), carries a bush (15), inside of which an end portion (16) of said first rod (13) is locked.

3. Temple (14), according to claim 2, characterized in that said end portion (16) of said first rod (13) is oxidised, so as to improve its gripping and sealing characteristics inside said bush (15).

4. Temple (14), according to claim 1, characterized in that at least a portion of said second rod (12) is covered with a sleeve (18).

5. Temple (14), according to claim 1, characterized in that said shape memory alloy, from which said first rod (13) is made, consists of a NiTi alloy.

6. Temple (14), according to claim 1, characterized in that said ductile material, from which said second rod (12) is made, consists of "Monel".

* * * * *